United States Patent

[11] 3,591,712

[72] Inventors Frans Brouwer
Glencoe;
Frank L. Sobchak, Chicago, both of, Ill.
[21] Appl. No. 739,018
[22] Filed June 21, 1968
[45] Patented July 6, 1971
[73] Assignee Stewart-Warner Corporation
Chicago, Ill.

[54] FACSIMILE PRINTER BAR ACTUATING MEANS

8 Claims, 8 Drawing Figs.

[52] U.S. Cl. .......... 178/6.6R, 178/7.6, 346/68; 346/139 R
[51] Int. Cl. .......... G01d 15/24
[50] Field of Search .......... 346/68, 136, 139 C, 74 E, 74 ES; 178/6.6, 7.6

[56] References Cited

UNITED STATES PATENTS

| | | | |
|---|---|---|---|
| 1,847,918 | 3/1932 | Blanchard | 346/68 |
| 2,601,247 | 6/1952 | Brady | 346/139 C |
| 2,631,917 | 3/1953 | Dueringer | 346/68 |
| 2,718,547 | 9/1955 | Wise | 346/139 C |
| 3,299,435 | 1/1967 | Dawe | 346/136 |
| 3,445,587 | 5/1969 | Jansen | 346/68 |
| 2,961,287 | 11/1960 | Zabriskie | 346/74 |

*Primary Examiner*—Robert L. Griffin
*Assistant Examiner*—Joseph A. Orsino, Jr.
*Attorneys*—Augustus G. Douvas, William J. Newman and Norton Lesser

ABSTRACT: Force transmitting means for moving a printer bar assembly into an operative position for printout of graphic data in facsimile apparatus upon rotation of recording paper drive means at a normal speed.

Inventors:-
Frans Brouwer,
Frank L. Sobchak,
By William J. Newman Att'y.

FACSIMILE PRINTER BAR ACTUATING MEANS

BACKGROUND OF THE INVENTION

1. Field of the Invention

The present invention pertains generally to facsimile apparatus for use in wire transmission of graphic data, and more particularly to improved printer bar actuating means for use in such apparatus.

2. Description of the Prior Art

In a typical optical facsimile system, elemental areas of copy material are successively scanned in a transmitter, and images from the scanned material are converted by an optical system into electrical signals for transmission to a receiver. At the receiver, electrical signals from the transmitter are converted to printing current and passed through associated printer contact means and a linear printer bar to produce on intervening moist electrolytic recording paper an image of the transmitted copy. One type of facsimile apparatus adapted for use as a transmitter or receiver is disclosed and claimed in the copending application of Frans Brouwer and Frank L. Sobchak, Ser. No. 613,545, filed Feb. 2, 1967, now U.S. Pat. No. 3,527,882. This apparatus embodies combined optical scanner and printer contact units, each including an optical scanner and printer contact means, mounted on a timing belt assembly for movement therewith in a continuous closed path. In the transmission mode of operation, the optical scanners are moved successively across copy material to be scanned, while in the receiving mode, the printer contact means are moved successively across recording paper lengthwise of the printer bar.

In the aforesaid apparatus, the printer bar is adapted to be moved into operative relation with the printer contact means in the receiving mode, and is biased away from operative relation with the printer contact means in the transmission mode to permit transmission of data without concurrent printout of such data in the same machine. To effect movement of the printer bar to an operative position, solenoid actuated linkage means has been provided. This form of printer bar actuating means, due primarily to the incorporation of solenoids and a relay for operating the solenoids, is not as inexpensive an arrangement as might be designed. Moreover, the solenoids effect sudden movement of the printer bar to the operative position causing snap unwinding of recording paper from the storage roll due to inertia which creates undesirable slack in the paper.

SUMMARY OF THE INVENTION

The present invention contemplates the elimination of solenoid and relay for actuating the printer bar, and the substitution therefor of force transmitting means operated by the drive means provided for rotating the roller means that draws recording paper between the printer contact means and the printer bar.

More particularly, facsimile apparatus of the type described above includes means for driving the drive roller means for the recording paper at two different speeds—a normal speed while data is being reproduced in the receiving mode, and a higher speed preliminary to and at termination of recording for rapidly clearing the printout area of dry paper or paper with reproduced data. In accordance with the present invention, the force transmitting means is arranged to move the printer bar into its operative position and to maintain it there when the drive roller means for the recording paper is driven at normal speed, and to permit the biasing means to move the printer bar away from its operative position when the drive roller means is driven at the higher speed. After the printer bar has been moved to an inactive position, it is maintained there by the biasing means until the drive roller means is again driven at normal speed.

The force transmitting means is comprised of a gear having a driving connection with the recording paper drive means, cam means having a slip-clutch frictional connection with the gear for limited rotation therewith, and lever means extending between the cam means and the printer bar. When the drive roller means is driven at normal speed, the gear is rotated in one direction, the cam means is rotated to a first position, and the lever means is operated to move the printer bar into its operative position. When the drive roller means is driven at the higher speed, the gear is rotated in the opposite direction, the cam means is rotated to a second position, and the lever means is operated to permit the biasing means to become effective.

The printer bar actuating means of the present invention is less expensive than solenoid actuated linkage means, and effects relatively slow, uniform movement of the printer bar into operative position thus eliminating abnormal unwinding of the recording paper. In facsimile apparatus, phasing signals are transmitted between two associated facsimile devices whereby the speed of recording is synchronized with the speed of scanning to obtain a true reproduction of the original copy material, and, typically, 15 seconds are allowed between messages to attain desired synchronization. With the arrangement of the present invention, the printer bar is moved to its operative position in about one-half of the time allowed between messages for initially establishing synchronization.

DESCRIPTION OF THE PREFERRED EMBODIMENT

Figures 1, 2:
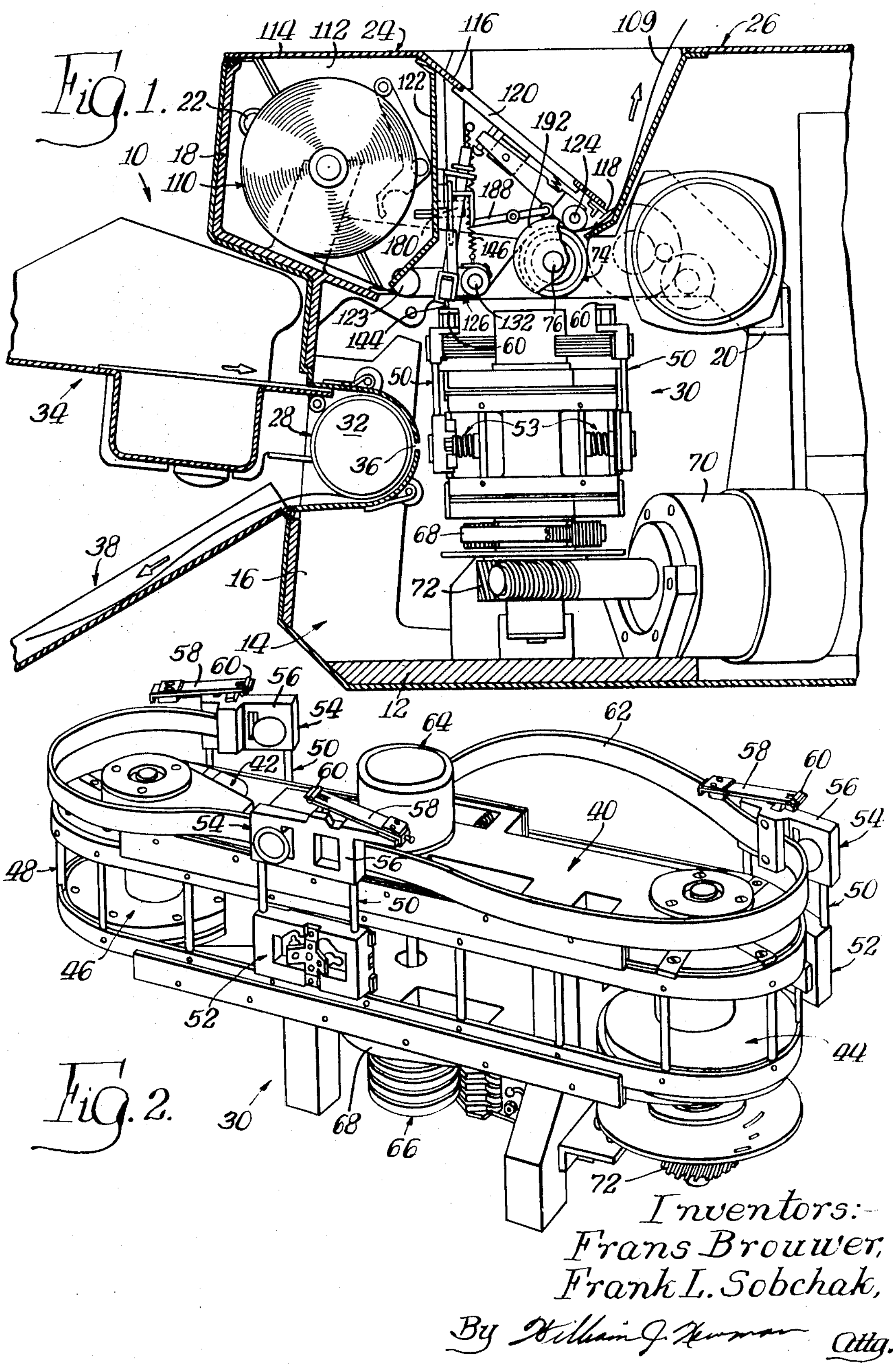
FIG. 1 is a view, partly in section and partly in elevation, of the front portion of a facsimile transceiver incorporating the principles of the present invention.
FIG. 2 is a perspective view, on an enlarged scale, looking toward the front of the optical scanner assembly of the facsimile transceiver of FIG. 1.

Referring now to FIG. 1, there is indicated generally by the reference numeral 10 one type of facsimile apparatus—a facsimile transceiver—incorporating the principles of the present invention. The facsimile transceiver 10 includes a framework comprised of a generally rectangular horizontal base member 12. Secured to the base member 12 adjacent the forward end thereof is a frame assembly 14 comprised of a pair of upright generally inverted L-shaped side frame members 16, only one of which is shown. The upper forward portions of the side frame members 16 are interconnected by a transverse troughlike shroud 18, while the inner rearward ends of the horizontal leg portions of the side frame members 16 are interconnected by a crossbar 20. Pivotally mounted to the shroud 18, as at 22, is a top door assembly 24 which, together with the side frame members 16, supports the printout mechanism operable in the receiving mode of the transceiver as will be described hereinafter. The various components of the transceiver 10 are suitably enclosed by a cover assembly 26, the forward portion of which is cut back to accommodate the top door assembly 24 in closed position.

Operable in the transmission mode of the facsimile transceiver 10 are a copy feed mechanism indicated at 28 and a scanner assembly indicated generally at 30. The copy feed mechanism 28 includes a transverse power driven copy feed roller 32 which draws copy material from a copy feed tray 34, feeds the copy material past a longitudinal scanning slot 36, and discharges the same onto a tray 38. The scanner assembly 30 extends parallel to the copy feed roller 32, and, as shown in FIG. 2, includes frame means comprised of a main frame 40 and a yoke member 42, drive and idler pulley assemblies 44 and 46, a timing belt assembly 48 trained about the pulley assemblies 44 and 46, combined optical scanner and printer contact units 50 carried by the timing belt assembly 48 and associated synchronizing and electrical transmission means.

Each scanner and printer contact unit 50 includes a lower optical scanner carriage assembly 52 with an optical scanner 53 (FIG. 1), and an upper carriage and contact assembly 54 comprised of a carriage block 56 and a printer contact assembly 58 having a contact element 60 in the form of a cylindrical pin member. The combined scanner and printer contact units 50 are adapted to be connected to other electrical components of the transceiver 10 by means of a ribbon tape 62 and a rotor assembly 64. The rotor assembly 64 includes a commutator assembly 66 and is adapted to be driven from the drive pulley assembly 44 by means of a belt 68. A motor 70 (FIG. 1) is arranged to drive a gear 72 at the lower end of the drive pulley assembly 44.

When the gear 72 is rotated, the drive pulley assembly 44 and the timing belt assembly 48 are correspondingly rotated, and the optical scanner carriage assemblies 52 are accordingly moved in a continuous closed path a portion of which extends parallel to the copy feed roller 32. As copy material is drawn about the copy feed roller 32, it is scanned, line-by-line an elemental area at a time. The images received by the optical scanners 53 from the copy material are converted to electrical signals by suitable circuitry, and these signals are sent to another transceiver or other suitable facsimile recording device for reproduction of the original copy material. For further details concerning the construction and operation of the above described components of the transceiver 10, reference may be made to the aforesaid copending application of Frans Brouwer and Frank L. Sobchak.

Figures 3, 5, 8:
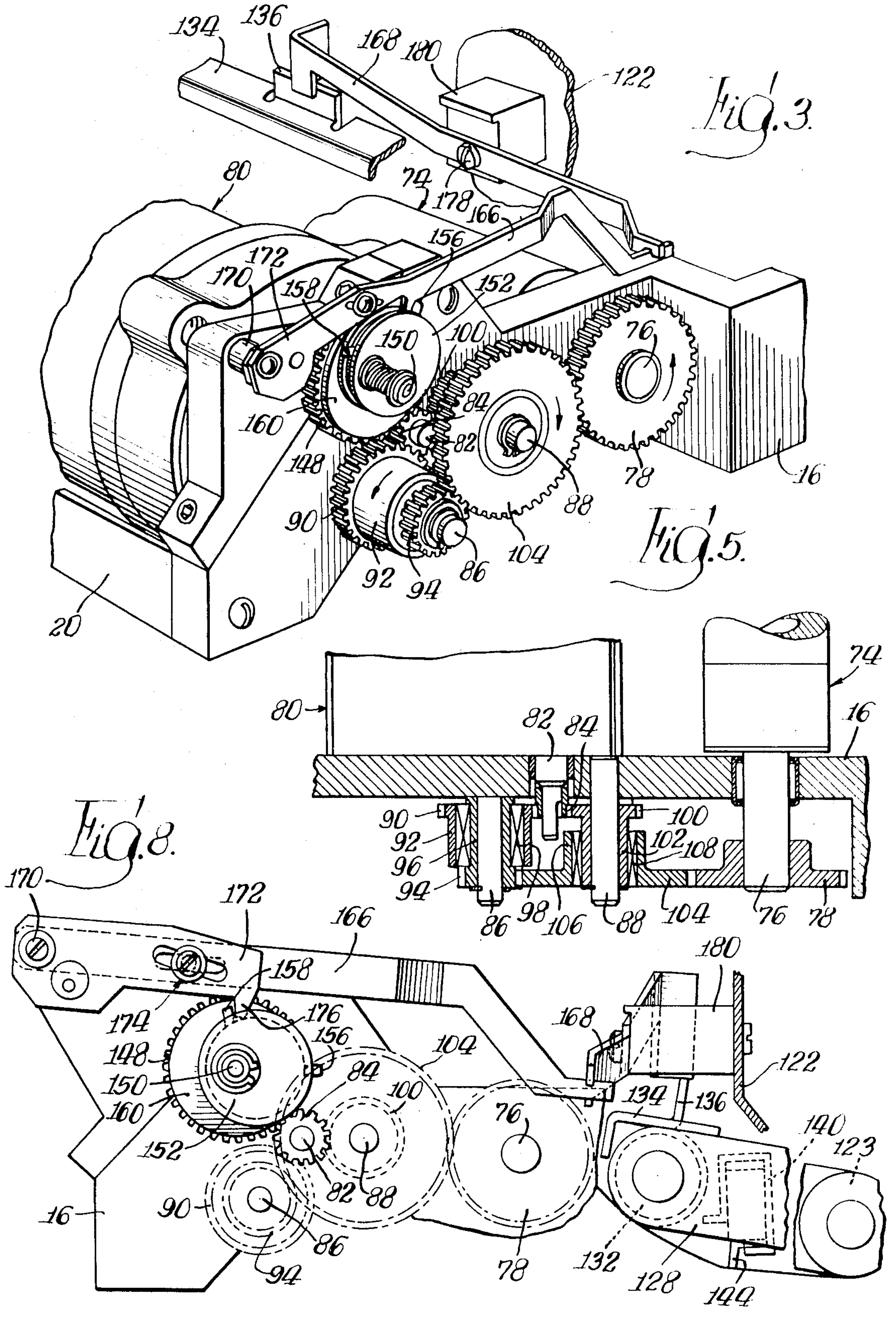
FIG. 3 is a perspective view, on an enlarged scale, of the printer bar actuating means of the present invention, and the drive gear mechanism with which it is associated.
FIG. 5 is a sectional view, taken substantially along the line 5—5 in FIG. 4, looking in the direction indicated by the arrows.
FIG. 8 is a partial side elevational view corresponding generally to FIG. 4, but showing the printer bar in its inactive position.

In the receiving mode of the facsimile transceiver 10, electrical signals received from another transceiver or other transmitter are converted to printing current by suitable circuitry, and this current is used to produce an image of the transmitted copy on electrolytic recording paper. The printout mechanism, operable in the receiving mode, includes the printer contact means carried by the scanner assembly 30, other components supported by the side frame members 16 and still other components supported in the top door assembly 24. As shown in FIGS. 1, 3 and 5, the drive means of the printout mechanism comprises a combined drive and heat roller assembly 74 located immediately above the scanner assembly 30. The drive and heat roller 74 is provided with axial stub shafts 76 which are journaled in the horizontal leg portions of the side frame members 16 of the frame assembly 14. Suitably secured to the outer end of one of the stub shafts 76 is a gear 78. In the receiving mode, the drive and heat roller assembly 74 is adapted to be rotated in a counterclockwise direction, as viewed in FIG. 3 in either one of two speeds.

The drive mechanism for effecting rotation of the gear 78 of the drive and heat roller assembly 74 comprises a single speed synchronous reversible motor 80 secured to the inboard side of the adjacent side frame member 16. The motor 80 is electrically connected to operate only when the transceiver is set in the receiving mode. The output shaft 82 of the motor 80 extends beyond the outboard side of the side frame member 16 and, as shown in FIGS. 3 and 5, has secured thereon a drive pinion 84. Secured in the side frame member 16 on opposite sides of the output shaft 82 and parallel thereto are first and second idler shafts 86 and 88. Mounted concentrically of the first idler shaft 86 is a first gear member 90 having a hub portion 92 and journaled on the shaft 86 is a second gear member 94 having a hub portion 96. Interposed between the hub portions 92 and 96 is a first overrunning clutch 98 through which the first gear member 90 is adapted to drive the second gear member 94 only in a counterclockwise direction. Journaled on the second idler shaft 88 is a third gear member 100 having a hub portion 102, and mounted concentrically about the shaft 88 is a fourth gear member 104 having a hub portion 106. Interposed between the hub portions 102 and 106 is a second overrunning clutch 108 through which the third gear member 100 is adapted to drive the fourth gear member 104 only in a clockwise direction. The drive pinion 84 has constant meshing engagement with the first and third gear members 90 and 100, while the fourth gear member 104 has constant meshing engagement with the second gear member 94 and the drive roller gear 78.

When the motor output shaft 82 is rotated in a clockwise direction, low speed drive is established between the drive pinion 84 and drive roller gear 78 through the first gear member 90, the first overrunning clutch 98, the second gear member 94 and the fourth gear member 104. When the motor output shaft 82 is rotated in a counterclockwise direction, high speed drive is established between the drive pinion 84 and the drive roller gear 78 through the third gear member 100, the second overrunning clutch 108 and the fourth gear member 104.

Rotation of the drive and heat roller assembly 74 serves to withdraw moist electrolytic recording paper 109 in a manner to be presently described, from a roll 110 (FIG. 1) rotatably supported in the shroud 18. The paper roll 110 is adapted to be enclosed by the top door assembly 24 which is comprised of sidewall portions 112, a top wall portion 114, an inclined wall portion 116 with a transverse serrated edge 118 and a viewing window 120, and an intermediate depending wall 122 having the flat side of a guide cylinder 123 secured along the lower edge thereof. When the top door assembly 24 is disposed in the closed position shown in FIG. 1, this assembly and the shroud 18 serve to define a humidor-compartment for the paper roll 110. Mounted at the underside of the inclined wall 116 of the top door assembly 24 is a pressure roller 124 which, when the top door assembly 24 is in closed position, is spring biased against the paper 109 in contact with the drive roller assembly 74 whereby to establish a frictional drive of the paper as the drive roller 74 is rotated.

Figures 4, 6, 7:
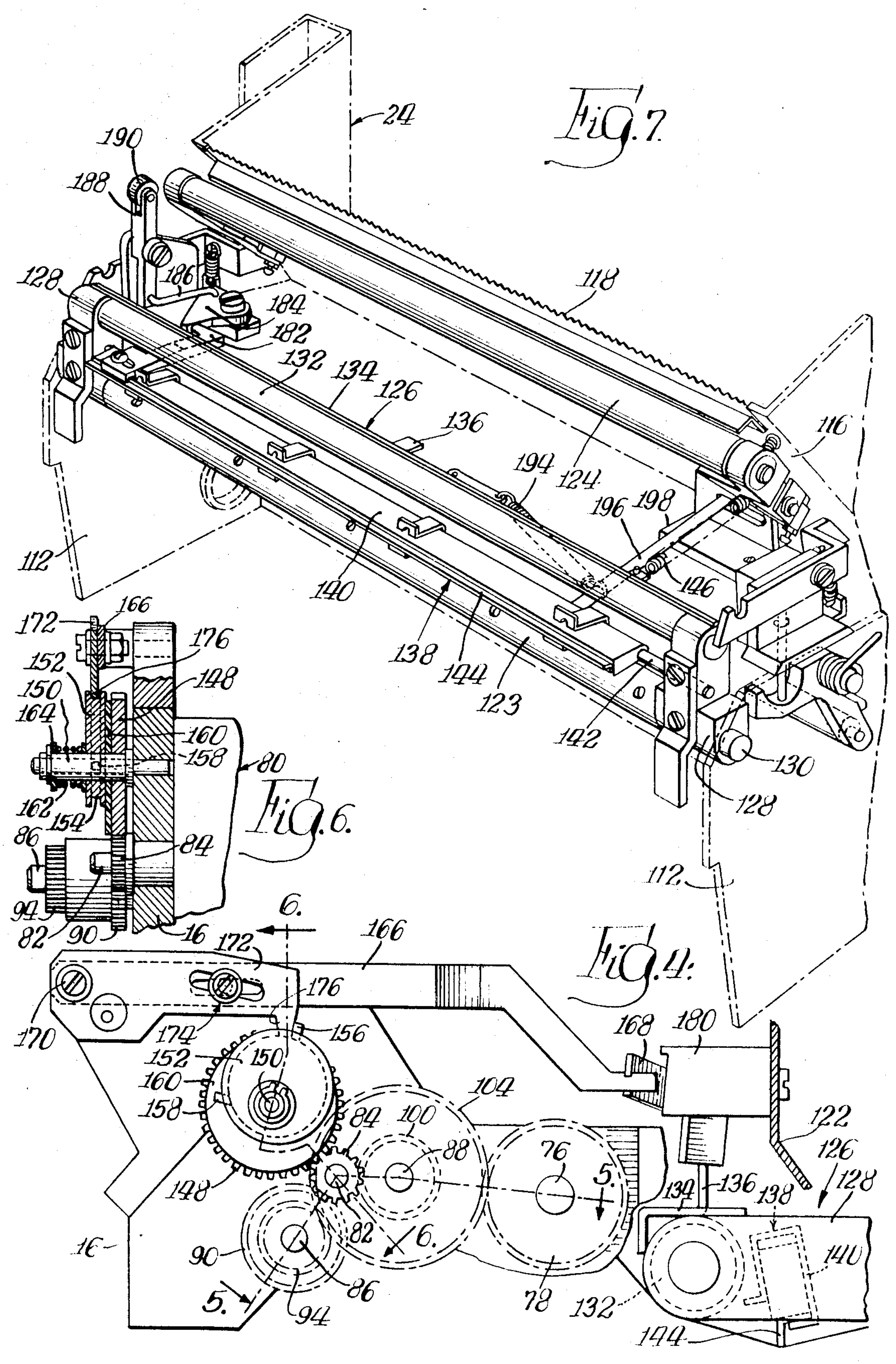
FIG. 4 is a partial side elevational view of the printer bar actuating means and drive gear mechanism of FIG. 3, with the printer bar being shown in its operative position.
FIG. 6 is a sectional view taken substantially along the line 6—6 in FIG. 4, looking in the direction indicated by the arrows.
FIG. 7 is an enlarged perspective view looking toward the rear of the printout mechanism of the transceiver of FIG. 1, with the top door assembly that supports the printout mechanism being shown in open position.

The top door assembly 24, as shown in FIGS. 1 and 7, also provides support for a combined paper tension and printer bar assembly 126. The assembly 126 includes arm members 128 pivotally mounted as at 130 to the sidewalls 112, a transverse tension roller 132 rotatably mounted in the ends of the arm members 128, and a parallel generally L-shaped brace member 134 extending between the ends of the arm members 128. The brace member 134 is provided with a central upstanding flange 136. Arranged intermediate of the guide cylinder 123 and the tension roller 132 is a printer bar unit 138 comprised of a support frame 140 having end stub shafts 142 slidably mounted in the arm members 128. Releasably mounted in and along the support frame 140 is a linear printer bar 144.

When the top door assembly 24 is in the closed position, the printer bar unit 138 is disposed vertically above and in the straight line path of travel of the scanner and printer contact units 50 along one side of the scanner assembly 300. In the transmission mode of the facsimile transceiver 10, the combined paper tension and printer bar assembly 126 is biased upwardly by means of a tension coil spring 146 extending between the inclined wall 116 and the brace member 134 of the assembly 126. In this position of the assembly 126, the lower edge of the printer bar 144 is maintained out of operative relation with the printer contact elements 60 of the printer contact units 50 and the printout mechanism is rendered inactive.

In accordance with the present invention, and as shown in FIGS. 3, 4 and 6, the printer bar assembly 126 is adapted to be pivoted downwardly for disposing the printer bar 144 in an active or operative printout position by force transmitting means which is operated by the above-described drive means for the drive roller assembly 74. The force transmitting means comprises a gear 148 which has constant meshing engagement with the drive pinion 84 and which is rotatably mounted on a spindle 150 secured in the side frame member 16 parallel to the printer bar assembly 126. Also rotatably mounted on the spindle 150 is cam means comprised of a cam plate 152 preferably in the form of a disc. The cam disc 152 is provided with a constant-depth peripheral groove 154 which along the bottom defines a cam surface, and with stop means in the form of circumferentially spaced radial stop elements 156 and 158. A clutch disc 160 is interposed between the gear 148 and the cam plate 152, and a coil spring 162 is interposed between shoulder means 164 on the spindle 150 and the cam plate 152 whereby a slip-clutch frictional connection is established between the gear 148 and the cam plate 152. As will be observed, the gear 148 and the cam plate 152 are mounted for rotation on a common axis with the cam plate being eccentric to the gear; in this manner camming action is achieved during rotation thereof.

Extending between the cam plate 152 and the printer bar assembly 126 is lever means comprised of a first (third-class) lever 166 and a second (first-class) lever 168. The first-lever is pivotally mounted at its one end, as at 170, to the side frame member 16, and extends in a direction transversely of the printer bar assembly 126. An arm extension 172 is adjustably secured along the side of the lever 166 by a screw and slot arrangement 174, and is provided with a cam follower portion or finger 176 engaged with the cam surface of the cam plate groove 154. The cam stop elements 156 and 158 are alternately engageable with the cam follower 176 whereby to limit rotary movement of the cam plate 152 in either direction, as the gear 148 is rotated, for establishing two operating positions of the cam plate. The second lever 168 is pivotally mounted intermediate of its ends, as at 178, to a support block 180 secured to the intermediate wall 122 of the top door assembly 24, and extends parallel to the printer bar assembly 126. One end of the lever 168 is engaged on top of the free end of the lever 166, while the other end of the lever 168 is engaged on top of the upstanding brace flange 136 of the printer bar assembly 126. When the top door assembly 24 is opened, the second lever 168 is free to move with it; when the top door assembly is closed, the biasing spring 146 maintains the lever 168 in proper engagement with the brace flange 136 and the first lever 166.

When the motor output shaft 82 is rotated counterclockwise for high-speed drive of the drive roller assembly 74, the gear 148 is rotated clockwise. By reason of the intermediate friction clutch disc 160, the cam plate 152 initially rotates clockwise with the gear 148 from the position shown in FIG. 4, until the stop element 158 engages the cam follower finger 176 as shown in FIG. 8. Thereafter, by reason of slippage permitted by the clutch disc 160, the cam plate 152 remains stationary while the gear 148 continues to rotates clockwise. As the cam plate 152 rotates from the first or high-point position shown in FIG. 4 to the second or low point position shown in FIG. 8, the free end of the lever 166 is thereby lowered, the lever 168 is permitted to pivot clockwise as viewed in FIG. 3, and the spring 146 serves to withdraw the printer bar assembly 126 to an inactive position.

When the motor output shaft 82 is rotated clockwise for low speed drive of the drive roller assembly 74, the gear 148 is rotated counterclockwise, and the cam plate 152 is correspondingly initially rotated counterclockwise until the stop element 156 engages the cam follower finger 176 as shown in FIG. 4 At this time, again by reason of slippage permitted by the clutch disc 160, the cam plate 152 remains stationary while the gear 148 continues to rotate counterclockwise. As the cam plate 52 is rotated from its second position shown in FIG. 8 to its first position shown in FIG. 4, the lever 166 is urged upwardly, the lever 168 is thereby pivoted counterclockwise as viewed in FIG. 3, and the printer bar assembly 126 is disposed downwardly to its operative position. Thereupon, the printer bar 144 presses the paper 109 downwardly into contact with the printer contact element 60 of the adjacent printer contact unit 50.

To equalize wear along the lower edge of the printer bar 144, means are provided for cyclically shifting the printer bar unit 138 lengthwise in the receiving mode. Briefly, such means comprises, as shown in FIGS. 1 and 7, a projection 182 secured to the printer bar support frame 140, a rocker plate 184, a link 186, a rocking lever 188 having a roller follower 190. When the top door assembly 24 is closed as shown in FIG. 1, the roller follower 190 engages the periphery of a cam member 192 rotatable with the combined drive and heat roller assembly 74. As the roller follower 190 rides over the cam member 192 during rotation thereof in the receiving mode, the rocking lever 188 and the associated linkage means are pivoted, and the projection 182 together with the printer bar unit 138 is shifted lengthwise to the right as viewed in FIG. 7. A tension coil return spring 194 serves to shift the printer bar unit 138 back to the left, and to maintain the roller follower 190 in continuous engagement with the cam member 192, while a guide rod 196, which is secured to the printer bar support frame 140 and slidably received in a guide bracket 198 carried by the top door assembly 24, serves to maintain the printer bar 144 perpendicular to the printer contact elements 60 during shifting movement of the printer bar unit 138 in the receiving mode.

With the top door assembly 24 closed as shown in FIG. 1, recording paper 109 from the roll 110 extends past the guide cylinder 123, across the bottom edge of the printer bar 144, about the tension roller 132, and between the drive roller 74 and the pressure roller 124. During initial startup in the receiving mode preliminary to recording, the drive and heat roller assembly 74 is driven at high speed for rapidly clearing the printout area of dry paper. During this initial high speed drive, as previously indicated, the cam plate 152 is rotated to the position shown in FIG. 8 (if it is not already in such position), and the levers 166 and 168 are thereby disposed to permit the spring 146 to maintain the printer bar assembly 126 in an inactive position . Then, while data is being reproduced the roller assembly 74 is driven in lower or normal speed, the cam plate 152 is rotated to the position shown in FIG. 4, and the levers 166 and 168 serve to pivot the printer bar assembly 126 downwardly into the operative position shown in FIGS. 1 and 4 whereupon the printer bar 144 is urged against the adjacent printer contact element 60 with the recording paper disposed therebetween.

As the timing belt assembly 48 is rotated, the printer contact units 50 move in the aforementioned continuous closed path and the printer contact elements 60 are successively move lengthwise of the printer bar 144. Printing current is passed through the associated printer contact elements 60, the recording paper and the printer bar 144, and iron from the printer bar 144 is deposited on the recording paper and reacts with chemicals therein to produce an image of the transmitted copy. In this manner, copy is reproduced, line-by-line, an elemental area at a time, in synchronism with another transceiver or suitable transmitter in which copy material is being scanned. As the recording paper passes over the combined drive and heat roller assembly 74, it is dried and the electrolytic printing process is completed.

Upon termination of printout, the drive and heat roller assembly 14 is driven momentarily at high speed to rapidly clear the reproduced copy from the area of printout, and the cam plate 152 is correspondingly rotated to the position shown in FIG. 8 whereupon the spring 146 pivots the printer bar assembly 126 upwardly to thereby withdraw the printer bar 144 to an inactive position away from the printer contact elements 60. After the printer bar 144 has been moved to an inactive position, it is maintained there by the biasing spring 146 until the drive roller 74 is again driven at normal speed. In sum, during normal feed of recording paper in the receiving mode, the printer bar assembly 126, the cam plate 152 and the intermediate lever means assume the positions shown in FIG. 4; at all other times, including fast paper runup and transmission mode operation, they assume the positions shown in FIG. 8. Additional details of the construction and operation of the various components of the printout mechanism, with which the force transmitting means of the present invention is associated, are disclosed in the aforesaid copending application of Frans Brouwer and Frank L. Sobchak.

While there has been shown and described a preferred embodiment of the present invention, it will be understood by those skilled in the art that various rearrangements and modifications may be made therein without departing from the spirit and scope of the invention.

We claim:

1. In a facsimile device having printer contact means, a printer bar assembly movable between a first position away from operative relation with the printer contact means and a second position in operative relation with the printer contact means, roller means for moving recording paper between the printer contact means and the printer bar assembly, and means including a drive motor for selectively rotating the roller means at one of two speeds, the improvement which comprises a mechanical linkage for moving said printer bar assembly between said first and second positions and means operated by the operation of said drive motor for actuating said mechanical linkage to move said printer bar assembly from one of its said two positions to the other upon rotation of said roller means at one speed and for moving said printer bar assembly from said other position to said one position upon rotation of said roller means at said other speed.

2. In a facsimile device having printer contact means movable in a path at least a portion of which extends in a horizontal straight line, a printer bar assembly extending parallel to the straight line portion of the path of the printer contact means, means biasing the printer bar assembly away from operative relation with the printer contact means, roller means extending parallel to the printer bar assembly for moving recording paper between the printer contact means and the printer bar assembly, and drive means including a reversible motor and gear means between the motor and the roller means for driving the latter at one speed in one direction upon rotation of the motor in one direction and at a different speed in said one direction upon rotation of the motor in the other direction, the improvement which comprises force transmitting means operated by said drive means for moving said printer bar assembly into operative relation with said printer contact means upon rotation of said roller means at said one speed and for permitting said biasing means to move said printer bar assembly away from operative relation with said printer contact means upon rotation of said roller means at said different speed.

3. The improvement of claim 2 wherein said force transmitting means comprises a gear having a driving connection with said motor, cam means having a slip-clutch frictional connection with said gear and being rotatable between a first position and a second position, said cam means being rotated to said first position upon rotation of said motor in said one direction and to said second position upon rotation of said motor in said other direction, and lever means extending between said cam means and said printer bar assembly for moving said printer bar assembly into operative relation with said printer contact means when said cam means is moved to said first position and for permitting said biasing means to move said printer bar assembly away from operative relation with said printer contact means when said cam means is moved to said second position.

4. The improvement of claim 3 wherein said cam means is comprised of a cam plate parallel to said gear and having a cam surface, and stop means for limiting rotary movement of said cam plate in either direction as said gear is rotated for establishing said first and second positions thereof; and wherein said lever means is comprised of a first lever having a cam follower portion engageable with said cam surface, and a second lever extending between said first lever and said printer bar assembly.

5. The improvement of claim 4 wherein the common rotational axis of said gear and said cam plate is parallel to said printer bar assembly, said first lever extends in a direction transversely of said printer bar assembly, and said second lever extends parallel to said printer bar assembly.

6. In a facsimile device, the combination of a printer bar assembly movable between an active position and an inactive position, movable cam means comprising a cam plate with a cam surface and circumferentially spaced radial stops along said surface defining first and second positions, means for moving said cam means between said first and second positions comprising a gear parallel to and having a slip-clutch frictional connection with said cam plate, and lever means having a cam follower portion engaging said cam surface and alternatively engageable with one of said radial stops, said lever engageable with said printer bar assembly for moving said printer bar assembly to said active position when said cam means is moved to said first position and for accommodating movement of said printer bar assembly to said inactive position when said cam means is moved to said second position.

7. The combination of claim 6 wherein said lever means is comprised of a third-class lever having an adjustable arm extension which includes said cam follower portion, and a first-class lever extending between said third-class lever and said printer bar assembly.

8. The combination of claim 6 wherein said cam plate is a disc with a constant-depth peripheral groove which defines said cam surface, and said gear and said disc are mounted for rotation on a common axis with said disc being eccentric to said gear.